United States Patent [19]

Kim

[11] Patent Number: 5,095,520

[45] Date of Patent: Mar. 10, 1992

[54] METHOD AND APPARATUS FOR DRAWING WIDE LINES IN A RASTER GRAPHICS SYSTEM

[75] Inventor: Chan W. Kim, Fremont, Calif.

[73] Assignees: Ricoh Company, Ltd., Tokyo, Japan; Ricoh Corporation, San Jose, Calif.

[21] Appl. No.: 534,745

[22] Filed: Jun. 7, 1990

[51] Int. Cl.$^5$ ............................................. G06K 15/00
[52] U.S. Cl. ..................................... 395/101; 395/143
[58] Field of Search ............................... 364/518–523; 340/739; 382/55, 44, 47; 395/100, 101, 103, 117, 143

[56] References Cited

U.S. PATENT DOCUMENTS 4,819,185  4/1989  Corona et al. .................... 340/728

OTHER PUBLICATIONS

Publication from "Graphics Programming in C" entitled Drawing Lines and Rectangles, by Roger T. Stevens, pp. 163–164.

Publication from "Computer Graphics" entitled Bresenham's Algorithm, by Harrington, pp. 17–20.

Publication from "Fundamentals of Interactive Computer Graphics" entitled Bresenham's Line Algorithm, by Foley & Van Dam, pp. 433–435.

Publication from "Computer Graphics" entitled Thick Line Segments, by Harrington, pp. 21–22.

Publication from "Graphics Programming in C" entitled Drawing Wide Lines, by Stevens, pp. 167–168.

Primary Examiner—Arthur G. Evans
Attorney, Agent, or Firm—Flehr, Hohbach, Test, Albritton & Herbert

[57] ABSTRACT

A method and apparatus for drawing wide lines in a raster graphics system such as a laser printing or display system utilizes a graphics processor with rectangle fill and single pixel line draw instructions. In a preferred embodiment, the present invention comprises a laser printer whose controller board main central processing unit (CPU) is a graphics processor and where the main firmware is a page description language interpreter.

6 Claims, 4 Drawing Sheets

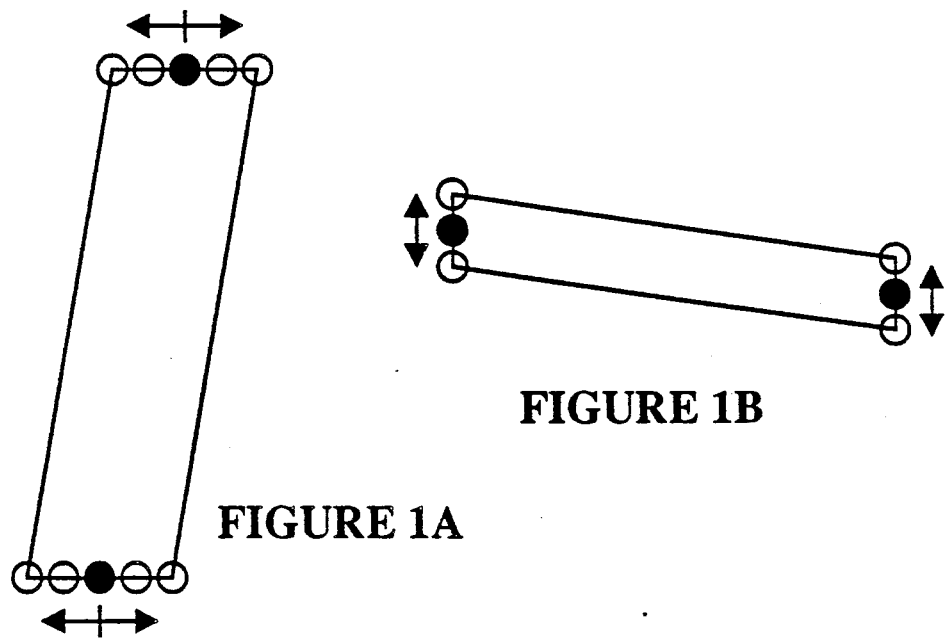
FIGURE 1B
FIGURE 1A
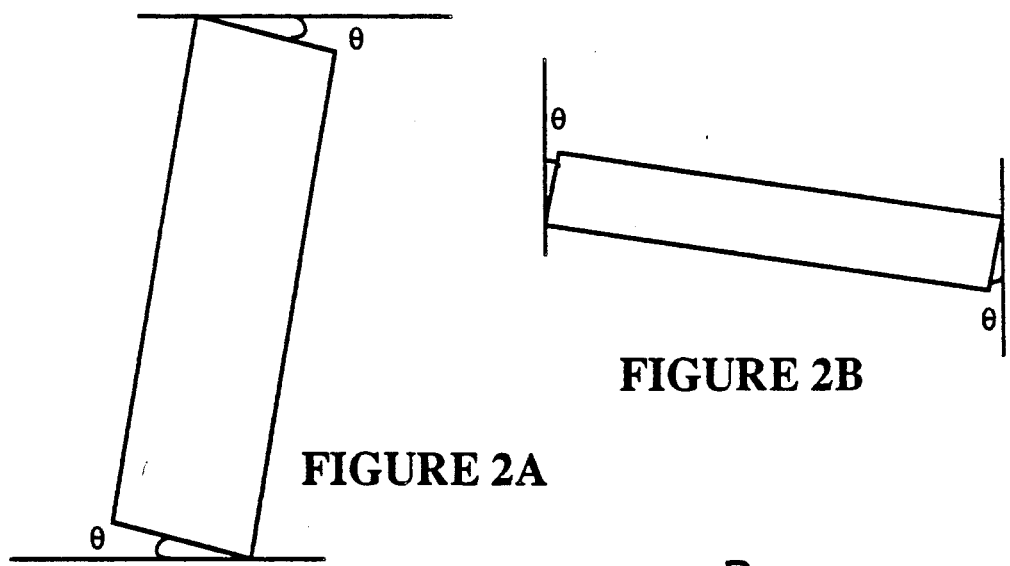
FIGURE 2B
FIGURE 2A
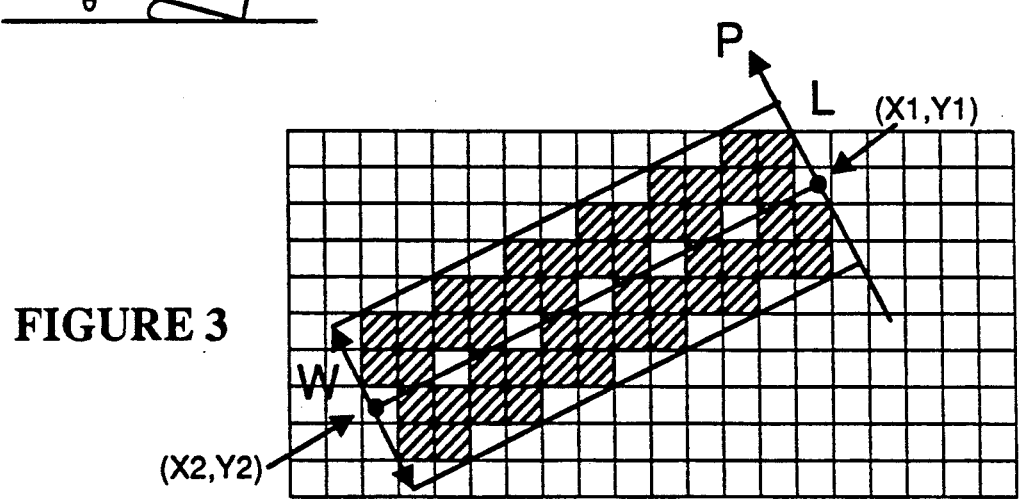
FIGURE 3

STEP 2
OOOO
OOOO    OOOOOOOOOOOOOOOOOOOOOOOOOOOOOOOOOO
OOOO    OOOOOOOOOOOOOOOOOOOOOOOOOOOOOOOOOO
OOOO
OOOO

FIGURE 7A

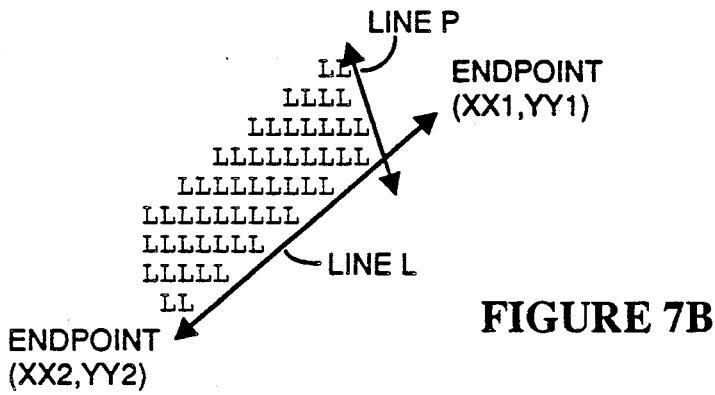

FIGURE 7B

```
       OO
      OOXXB      O = Pixels filled during the first iteration
     OOXXB      X = Pixels filled during the second iteration
    OOXXB       B = Blanks to be created if another line parallel
   OOXXB           to L were to be drawn along P
  OOXXB
  XXB
```

FIGURE 7C

```
       OO
      OOXX
     OOXXZZ
    OOXXZZ
   OOXXZZ       Z = Line drawn at (X,Y-1) fills the B's created
  OOXXZZ           in step 7.
  XXZZ
  ZZ
```

FIGURE 7D

```
       OO ·
      OOXX
     OOXXZAA
    OOXXZAABB
   OOXXZAABB    A = Pixels filled during the fourth iteration
  OOXXZAABB    B = Pixels filled during the fifth iteration
  XXZAABB
  ZAABB
  BB
```

FIGURE 7E

METHOD AND APPARATUS FOR DRAWING WIDE LINES IN A RASTER GRAPHICS SYSTEM

BACKGROUND OF THE INVENTION

The present invention relates to a method and apparatus for drawing wide lines in a raster graphics system, and more particularly to a laser printing or display system.

The development of laser printers and page description languages allow a user to create complex documents with graphics primitives — lines, arcs and curves. The more complex the documents are, the more graphics primitives they use. Unfortunately, this approach means more processing time must be spent on rasterizing the primitives. Efficient processing of the graphics primitives by the printer's interpreter would increase throughput and likely improve the marketability of the printer.

Among the graphics primitives, line is the most often used. Laser printer interpreters often convert arcs and curves into contiguous line segments. Polygons are filled by repeatedly drawing lines over the area. Moreover, many fonts used in the laser printer systems are in outline forms, requiring the interpreter software to process the fonts as lines and arcs. Thus, a fast line drawing method is imperative for efficient graphics processing.

Line drawing in computer graphics is accomplished by turning on pixels on an imaginary square grid (page frame buffer). The pixels turned on must lie between the two end pixels in such a way that they approximate a line. There are well known algorithms to do this, most noticeably Bresenham's algorithm. On some graphics microprocessors, Bresenham's algorithm can be executed by single assembly instruction. For example, the TMS34010 microprocessor has a LINE instruction, along with parameter set up registers, which does the line drawing.

Bresenham's algorithm and the LINE instruction draws a line of width of one pixel. However, a single pixel line is rarely used in laser printing, since a typical laser printer's resolution is more than 300 dots per inch. A single pixel line often cannot be perceived by the human eye as a continuous line. For lines of width greater than one pixel, a wide line can be drawn with or without using the algorithm.

There are known algorithms to draw wide lines. One such algorithm widens a single pixel line by placing additional pixels on either side, or above and below each pixel. Whether to put additional pixels on side, or above and below, depends on the slope of the line being drawn. This algorithm's problem is that the line drawn is not rectangular unless it is vertical or horizontal, unless the resulting page is non-uniformly scaled (see FIG. 1). Typical page description language line is rectangular regardless of its slope (see FIG. 2). Also see pages 21-22 of *Computer Graphics* by Steven Harrington, and pages 167-168 of *Graphics Programming in C* by Roger T. Stevens.

In U.S. Pat. No. 4,819,185, rectangular wide line drawing is described regardless of the line's slope, but it effectively fills the holes generated by stacking Bresenham's lines to draw a wide line. However, that drawing method does not distinguish between sloped lines and non-sloped lines, horizontal and vertical. Distinguishing the non-sloped lines and sloped lines are crucial in the laser printer system employing TMS340xx processors, since the processor can fill a horizontal or vertical line (a rectangle) very efficiently using its rectangle fill instruction.

SUMMARY OF THE INVENTION

It is an object of the present invention to provide an improved method and corresponding apparatus for a method and apparatus for drawing wide lines in a raster graphics printing system.

It is a more particular object of the present invention to improve wide line drawing efficiency in a raster printing systems such as the laser printer system using a graphics processor with rectangle fill and single pixel line draw instructions.

In one preferred embodiment, the present invention comprises a laser printer whose controller board's main CPU is TMS340xx type graphics processor, and whose main firmware includes a page description language interpreter.

The method for drawing wide lines in a raster graphics system according to one embodiment of the present invention includes the steps of determining if a wide line L to be drawn on a raster graphics printer or display is horizontal or vertical, and if the line is horizontal or vertical, drawing the wide line.

If the line has a slope other than horizontal or vertical, another embodiment of the present invention includes the further steps of determining a line P perpendicular to said line L, including determining the end points in X and Y directions of the line P, calculating the absolute length of the X and Y directions and calculating incremental values in said X and Y directions to traverse the line P, drawing a line parallel to line L, originating on line P, determining if the next point on line P is diagonal through the current point, drawing a line parellel to line L, originating from the next point minus one, in the X or Y direction, incrementing in the X or Y direction on line P, and incrementing in the Y or X direction on line P until all points on line P have been traversed.

Additional objects, advantages and novel features of the present invention will be set forth in part in the description which follows and in part become apparent to those skilled in the art upon examination of the following, or may be learned by practice of the invention. The objects and advantages of the invention may be realized and attained by means of the instrumentalities and combinations which are pointed out in the appended claims.

BRIEF DESCRIPTION OF THE DRAWINGS

The accompanying drawings which are incorporated in and form a part of this specification illustrate an embodiment of the invention and, together with the description, serve to explain the principles of the invention.

FIGS. 1A-B and 2A-B illustrate methods of drawing wide lines in a raster graphics printing system, as referenced in the background of the invention FIG. 3 illustrates a method of drawing wide lines in a raster graphics system according to the present invention.

FIGS. 7A-7E depict illustrations of the line drawing aspects of the present invention taken in conjunction with the flow chart of FIG. 4.

DETAILED DESCRIPTION OF THE DRAWINGS

Reference will now be made in detail to the preferred embodiment of the present invention, an example of which is illustrated in the accompanying drawings. While the invention will be described in conjunction with the preferred embodiment, it will be understood that it is not intended to limit the invention to that embodiment. On the contrary, it is intended to cover alternatives, modifications and equivalents as may be included within the spirit and scope of the invention as defined by the appended claims.

Referring to FIG. 3, it is assumed that a line's two end points and its width are known. They are conveniently named (x1, y1), (x2, y2) and W, respectively. The line to be drawn will be conveniently referred to as L.

If the line L is either horizontal or vertical, the processor's fill rectangle instruction is used. A test to determine whether L is vertical or horizontal is performed, using the end points of A: if $x2 - x1 = 0$, L is vertical; and if $y2 - y1 = 0$, L is horizontal. The fill instruction operates on a two dimensional array of pixels. Given the line L's information such as width, height and position of A, the instruction regards the line L as a rectangle and fills its area in the pixel array.

If L is neither horizontal nor vertical (i.e., L is a sloped line), the method according to the present invention draws L by using Bresenham's algorithm and the processor's line draw instruction, which draws a line of a single pixel width. Using the two end points and W, the method first obtains a line of length W which is perpendicular to L. This new line (P) forms a side of the rectangle constructed out of L. The improved method then uses Bresenham's algorithm to traverse the line P of length W. As the method traverses P, it draws, for each pixel on P, a perpendicular line of length equal to the line L's length. The processor's line instruction is used to draw these lines Since the instruction also uses Bresenham's algorithm, the rectangle constructed by stacking the lines creates holes in the rectangle. These holes are filled by the following algorithm.

On traversing P whenever the next point on P is located diagonally to the current point on P, a line is drawn using the instruction parallel to L from (next point's X position, next point's Y position $- 1$).

Figure 4:
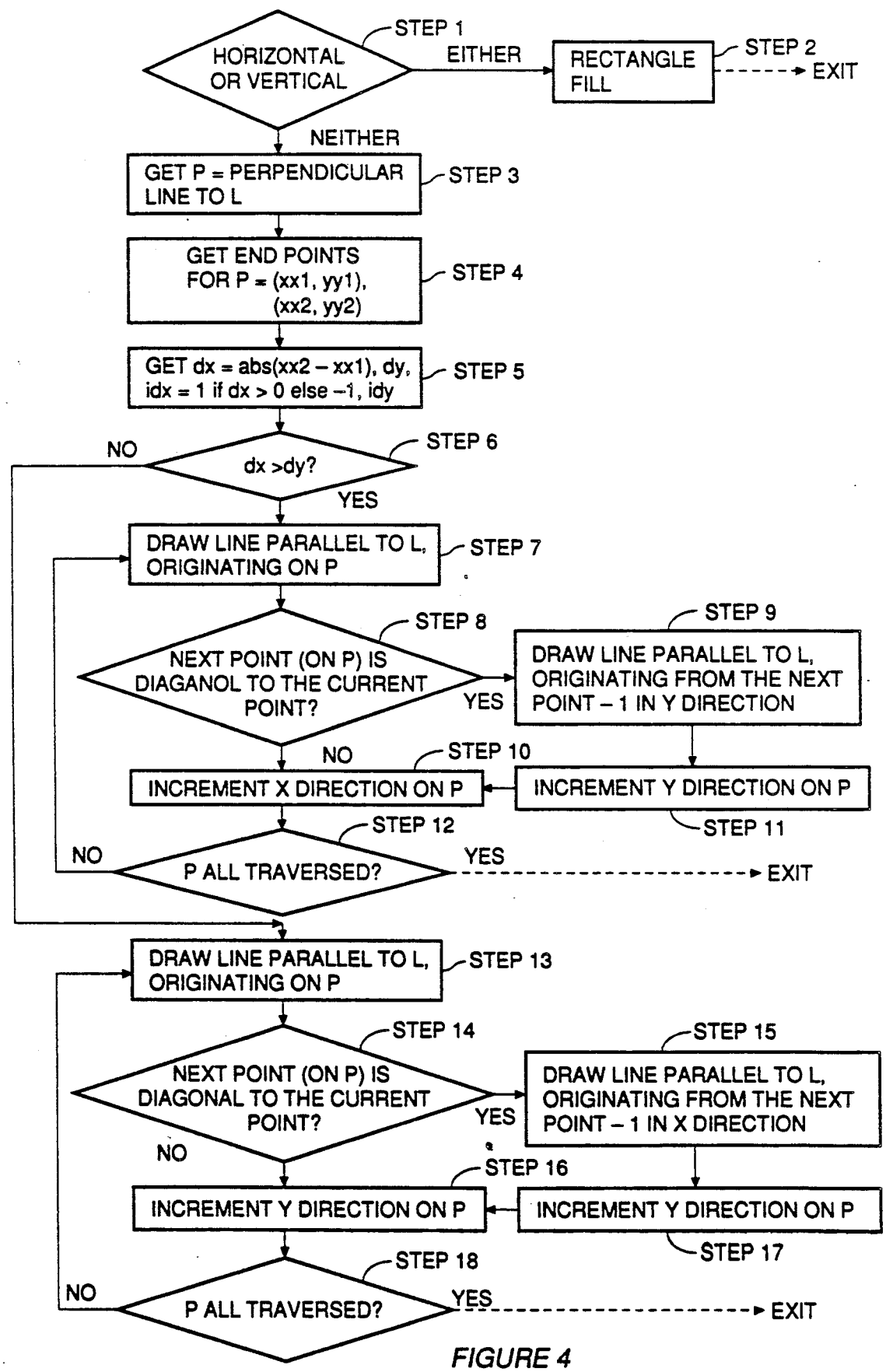
FIG. 4 illustrates a flow chart describing the operation of the present invention.

FIG. 4 is the algorithm's flow chart according to the present invention. In Step 1, a given line is checked to see whether it is vertical or horizontal. If the line has no slope, it is treated as a rectangular box, and the processor's fill box instruction is used to draw the line (Step 2).

In Steps 3 and 4, the line's perpendicular line and its end points are obtained. In Step 5, P's absolute length in x and y directions are calculated. Incremental values in x and y directions are also calculated. These variables are used to generate Bresenham's line of P. The original line is drawn by drawing a perpendicular line for each point on P where the points on P are generated by the paper's method. P is traversed from top to bottom, starting with the highest y value.

P is traversed along x if $dx > dy$, and y if otherwise (see Step 6).

In Step 7, a perpendicular line to P is determined from a point on P. This line is drawn using the processor's line instruction; the instruction builds a Bresenham's line. The next point is calculated and checked in Step 8. If the next point's coordinate differ in both x and y directions with the current point, another line perpendicular to P is drawn from a point on P whose coordinate is one lower in y direction than the current point (see Step 9).

Steps 10 and 11 increment variables so that the next point on P is correctly calculated This process is continued until every point on P is traversed (see Step 12).

Steps 13 through 20 in FIG. 4 are analogous to Steps 6 through 12.

Figure 5:
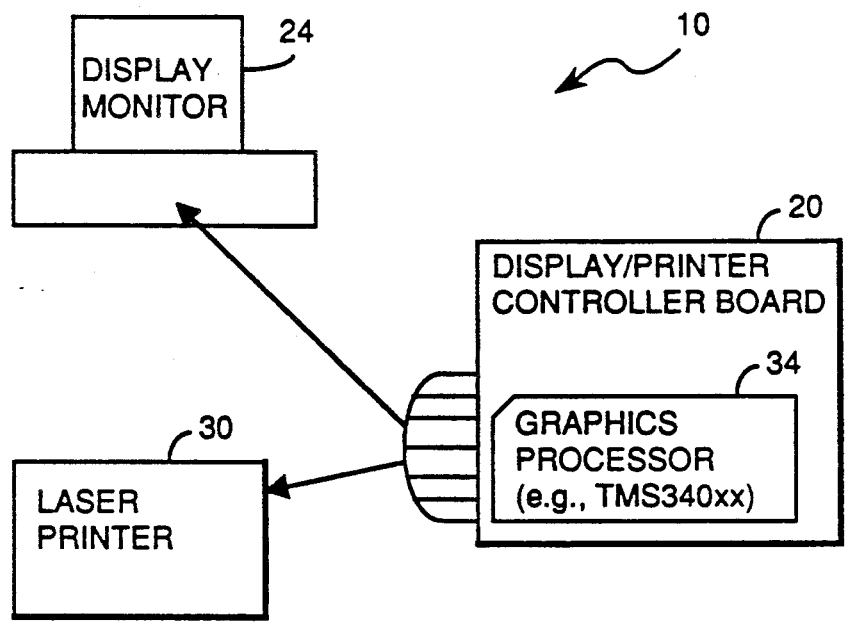
FIG. 5 depicts a diagram of an apparatus for drawing wide lines in a raster graphics system according to the present invention.

FIG. 5 illustrates a diagram of apparatus 10 utilized for drawing wide lines in a raster graphic printing/displaying system according to the present invention.

In FIG. 5, a display/printer controller board 20 controls a display monitor 24 and a laser printer 30 utilizing in a preferred embodiment a graphics processor (e.g. TMS340xx).

The graphics processor 34 contains a Line instruction command which draws a line in accordance with known techniques, such as Bresenham's algorithm.

Figure 6:
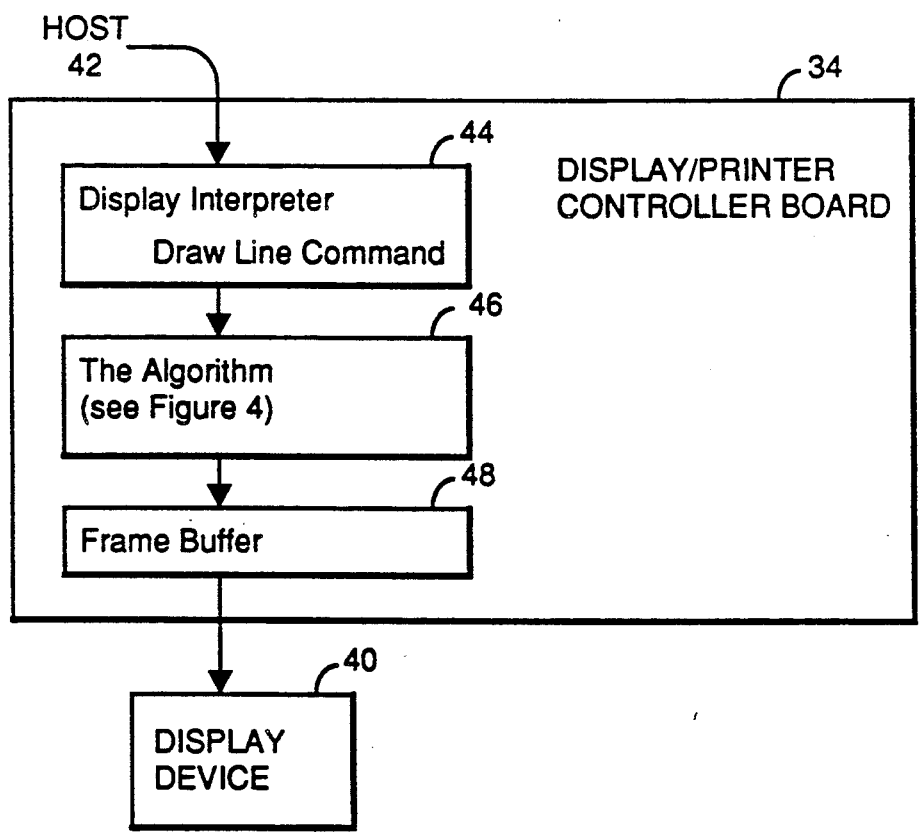
FIG. 6 depicts a block diagram illustrating the aspects of the apparatus of FIG. 5.

FIG. 6 shows a general block diagram illustrating the functional aspects of FIG. 5. In FIG. 6, the display/printer controller board 34 receives communications from a host computer 42, and display interpreter 44 interprets a draw line command.

The algorithm 46 according to the present invention is then implemented. The algorithm is set forth in flow chart form in FIG. 4.

The frame buffer 48 of the controller board 34 provides interfacing with a display device 40, as shown in FIG. 6.

The controller board 34 of FIG. 6 receives commands from the host computer 42 which could be a command. The controller board 34 interprets that command and stores the resulting output into the frame buffer 48. The command could be "draw a line," or "draw a rectangle," which is then sent to the display device 40.

FIGS. 7A-7E illustrate the sequence of steps taken in accordance with the present invention, and particularly with the flow chart set forth in FIG. 4.

In FIG. 7A, horizontal and vertical lines are drawn using the processor's line drawing instruction (step 2).

The illustration of steps 3, 4, 7 and 9 of the flow chart in FIG. 4 are now discussed, using the example set forth in FIG. 3.

In FIG. 7B, the steps 3 and 4 of the flow chart in FIG. 4 are illustrated showing the end points and the calculation of the perpendicular line "P".

In FIG. 7C, step 7 of FIG. 4 is shown in which the following is shown:

0 = pixels filled during the first iteration
X = pixels filled during the second iteration
B = blanks to be created if another line parallel to L were to be drawn along P.

FIG. 7D shows step 9 of the flow chart of FIG. 4, in which

Z = the line drawn at (X,Y−1) fills the B's created in step 7C.

FIG. 7E shows step 12 of FIG. 4 (steps 7 and 9 are continued until the line is completed). In FIG. 7E, A = pixels filled during the fourth iteration and
B = pixels filled during the fifth iteration.

The foregoing description of the preferred embodiment of the present invention has been presented for purposes of illustration and description. It is not intended to be exhaustive or to limit the invention to the precise form disclosed, and many modifications and variations are possible in light of the above teachings. The preferred embodiment was chosen and described in order to best explain the principles of the invention and its practical applications to thereby enable others skilled in the art to best utilize the invention and various embodiments and with various modifications as are suited to the particular use contemplated It is intended that the scope of the invention be defined only by the claims appended hereto.

What is claimed is:

1. A method for efficiently drawing wide lines in a raster graphics system, said raster graphics system having a line drawing primitive for automatically drawing thin lines having a predefined width and a rectangle fill primitive for automatically drawing a filled rectangular region; said method comprising the steps of:

identifying a wide line L to be drawn;
   determining whether or not said wide line L is either horizontal or vertical;
   whenever said wide line L is determined to be either horizontal or vertical, drawing said wide line L by drawing a corresponding filled rectangle with said rectangle fill primitive; and
   whenever said wide line L is determined to be neither horizontal nor vertical, drawing said wide line L by:
      calculating a line P perpendicular to said line L, said line P have first and second end points;
      starting at said first end point of said line P and proceeding toward said second end point of said line P, for each point along line P with a unique first coordinate value, drawing with said line drawing primitive a thin line parallel to line L at a position corresponding to said point along P; and
      furthermore, for each point along line P which has a different second coordinate value from its preceding point along line P, drawing with said line drawing primitive an additional thin line at a position corresponding to said point along P but shifted by one point in a direction corresponding to said second coordinate value.

2. A method according to claim 1, wherein said predefined width of thin lines is a width of one pixel and each point along said line P comprises a distinct pixel.

3. A method according to claim 1, wherein each of said drawing steps comprises writing data to a pixel frame buffer, said method further including generating an image corresponding to said data written to said pixel frame buffer.

4. Apparatus for efficiently drawing wide lines in a raster graphics system, said raster graphics system having a line drawing primitive for automatically drawing thin lines having a predefined width and a rectangle fill primitive for automatically drawing a filled rectangular region; said method comprising the steps of:

means for identifying a wide line L to be drawn;
   means for determining whether or not said wide line L is either horizontal or vertical;
   first drawing means for drawing said wide line L by drawing a corresponding filled rectangle with said rectangle fill primitive whenever said wide line L is determined to be either horizontal or vertical, drawing said wide line L by drawing a corresponding filled rectangle with said rectangle fill primitive; and
   second drawing means for drawing said wide line L with said by line draw primitive whenever said wide line L is determined to be neither horizontal nor vertical, including means for
      calculating a line P perpendicular to said line L, said line P have first and second end points;
      starting at said first end point of said line P and proceeding toward said second end point of said line P, for each point along line P with a unique first coordinate value, drawing with said line drawing primitive a thin line parallel to line L at a position corresponding to said point along P; and
      furthermore, for each point along line P which has a different second coordinate value from its preceding point along line P, drawing with said line drawing primitive an additional thin line at a position corresponding to said point along P but shifted by one point in a direction corresponding to said second coordinate value.

5. Apparatus according to claim 4, wherein said predefined width of thin lines is a width of one pixel and each point along said line P comprises a distinct pixel.

6. Apparatus according to claim 4, wherein said first and second drawing means write data to a pixel frame buffer, said apparatus further including means for generating an image corresponding to said data written to said pixel frame buffer.

* * * * *